United States Patent
Hafer et al.

(10) Patent No.: US 7,957,223 B2
(45) Date of Patent: Jun. 7, 2011

(54) ULTRASONIC RANGING IN THE NEAR ZONE

(75) Inventors: Kevin G. Hafer, Douglassville, PA (US); Jules Joseph DiRienzo, Jr., Chalfont, PA (US)

(73) Assignee: Ametek, Inc., Berwyn, PA (US)

( * ) Notice: Subject to any disclaimer, the term of this patent is extended or adjusted under 35 U.S.C. 154(b) by 580 days.

(21) Appl. No.: 11/885,493

(22) PCT Filed: Mar. 16, 2006

(86) PCT No.: PCT/US2006/009890
§ 371 (c)(1),
(2), (4) Date: Mar. 14, 2008

(87) PCT Pub. No.: WO2006/099601
PCT Pub. Date: Sep. 21, 2006

(65) Prior Publication Data
US 2008/0279044 A1    Nov. 13, 2008

Related U.S. Application Data

(60) Provisional application No. 60/662,875, filed on Mar. 16, 2005.

(51) Int. Cl.
*G01S 15/00*    (2006.01)
(52) U.S. Cl. .......................................................... 367/99

(58) Field of Classification Search ..................... 367/99
See application file for complete search history.

(56) References Cited

U.S. PATENT DOCUMENTS

| 4,733,355 A | 3/1988 | Davidson et al. | |
| 6,484,088 B1 * | 11/2002 | Reimer | 701/123 |
| 6,573,732 B1 * | 6/2003 | Reimer | 324/644 |
| 2004/0239651 A1 | 12/2004 | Sakurai | |
| 2008/0279044 A1 * | 11/2008 | Hafer et al. | 367/99 |

FOREIGN PATENT DOCUMENTS

| DE | 103 05 003 | 8/2004 |
| EP | 1869498 A2 * | 12/2007 |
| WO | 01/84086 | 11/2001 |

* cited by examiner

*Primary Examiner* — Dan Pihulic
(74) *Attorney, Agent, or Firm* — Stradley Ronon Stevens & Young, LLP (57) ABSTRACT

An ultrasonic ranging device for ultrasonic ranging in the near zone. The device may include a transducer for generating an ultrasonic signal and for detecting an echo signal. The device may also include a processor for calculating the distance to a target object based on a first time period defined by a first set of ultrasonic signals when the target object is located outside the near zone and a second time period defined by a second set of ultrasonic signals when the target object is located within the near zone. The processor may also adjust the amplitude of the generated ultrasonic signal until the first set of ultrasonic signals is detected at the transducer.

9 Claims, 8 Drawing Sheets

FIGURE 5

ULTRASONIC RANGING IN THE NEAR ZONE

CROSS REFERENCE TO RELATED APPLICATIONS

This application claims priority under 35 U.S.C. §119(e) of U.S. Provisional Patent Application Ser. No. 60/662,875, filed Mar. 16, 2005.

FIELD OF THE INVENTION

The invention is directed generally to ultrasonic ranging devices and more particularly to ultrasonic ranging devices for ranging in the near zone.

BACKGROUND OF THE INVENTION

An ultrasonic ranging device may be used to detect the presence of and/or distance to a target object, such as an object located underground or stored in an enclosed container. The ultrasonic ranging device typically operates by generating an ultrasonic signal or pulse, which may be reflected upon striking the target object. The ranging device may listen for the reflected ultrasonic signal, or echo signal, and measure the period between the time the signal is sent and the time the echo signal is received. By measuring this time period, the ranging device may determine the distance between the device and the target object. For example, the ranging device may be placed at the top of a storage tank in order to measure the distance from the top of the tank to the top surface of a material in the tank. Thus, the ranging device may be used to determine the level of material in the tank.

Some ultrasonic ranging devices may include a transducer for both generating the ultrasonic signal and receiving, or detecting, an echo signal that bounces back from the target object. Such devices often have a parameter called "near zone," which may refer to the minimum distance that can be measured by the ranging device. In other words, the ranging device may not be capable of measuring the distance to a target object that is located within the near zone.

The near zone limitation may be caused by a "ringing" effect that frequently occurs in the transducer after it generates an ultrasonic signal or pulse. Ringing refers to a series of (decaying) signals that are usually generated by the transducer after an input electrical signal is no longer applied to the transducer. A larger input electrical signal may increase both the amplitude of the generated ultrasonic signal and the ringing time in the transducer (e.g., the time it takes the transducer to get up to 90% of maximum amplitude, or down to 10% above zero amplitude). Ringing in the transducer may limit the transducer's ability to detect an echo signal from a close target object due to signal interference (i.e., the amplitude of the echo signal may be smaller than that of the decaying signals). Thus, the ranging device may be incapable of both detecting the presence of and determining the distance to the target object, thereby limiting the utility of the ranging device. Therefore, a need exists for an ultrasonic ranging device that overcomes these difficulties to permit ultrasonic ranging in the near zone.

SUMMARY OF THE INVENTION

The described embodiments contemplate a device and method for ultrasonic ranging in the near zone. In one embodiment, the device may include a transducer for generating an ultrasonic signal and for detecting an echo signal. The device may also include a processor for calculating the distance to a target object based on a first time period defined by a first set of ultrasonic signals when the target object is located outside the near zone and a second time period defined by a second set of ultrasonic signals when the target object is located within the near zone. In another embodiment, the device may include a transducer and a processor for adjusting the amplitude of the generated ultrasonic signal until a first echo signal is detected at the transducer. The processor may calculate the distance to the target object based on a time period between the generated ultrasonic signal and the first echo signal.

The method may include generating an ultrasonic signal, detecting a first echo signal, determining a first time period defined by the generated ultrasonic signal and the first echo signal, and comparing the first time period to a second predetermined time period. If the first time period is less than the second predetermined time period, then detecting at least one additional echo signal, determining a third time period defined by consecutive echo signals, comparing the first time period with the third time period, and calculating the distance to the target object using a time period based on the comparison result.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION OF ILLUSTRATIVE EMBODIMENTS

The subject matter of the described embodiments is described with specificity to meet statutory requirements. However, the description itself is not intended to limit the scope of this patent. Rather, the inventor has contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Ultrasonic ranging devices typically include components for generating and detecting ultrasonic signals and for determining the time period defined by a set of ultrasonic signals. The time period defined by a set of ultrasonic signals may be related to the distance between the ranging device and a target object. Conventional ultrasonic ranging devices often have difficulty measuring the distance to the target object when the target object is within a certain area known as the "near zone." Generally, a ranging device's inability to measure distances in the near zone may be caused by the ringing of a transducer in the ranging device that may be used to generate ultrasonic signals. That is, the transducer may be unable to detect reflected ultrasonic signals, or echo signals, because the decaying generated ultrasonic signals may be larger than the return echo signals. The ratio of the generated ultrasonic signal and the expected return echo signal for a given distance may be one of the factors that determine the near zone limit of an ultrasonic ranging device. Typically, an ultrasonic ranging device with a longer range may also have a larger near zone as a result of an increase in the amplitude, or energy, of the generated ultrasonic signal.

Figure 1A:
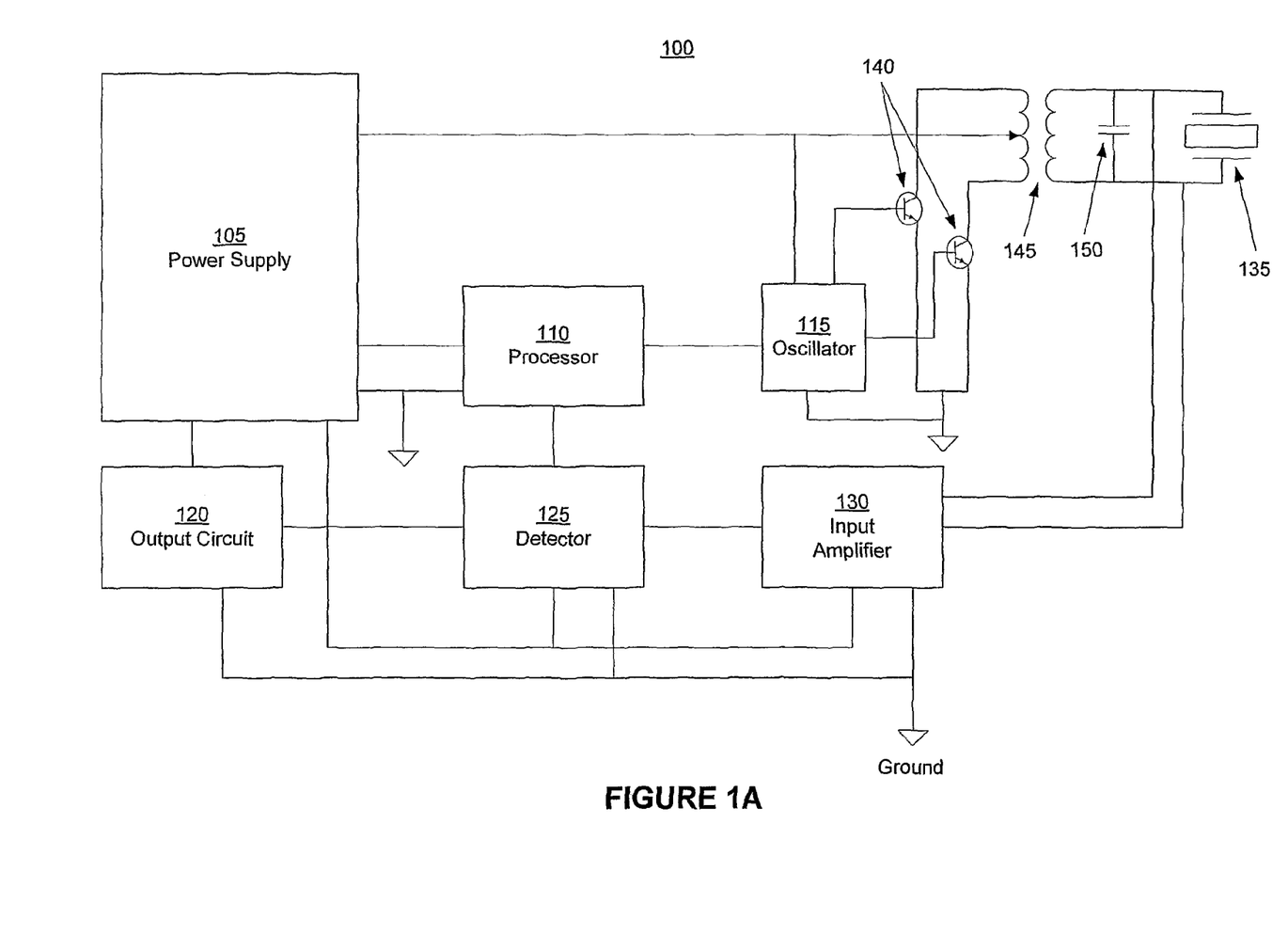
FIG. 1A is a block diagram of an ultrasonic ranging device, in accordance with an embodiment.

FIG. 1A is a block diagram of an ultrasonic ranging device for ultrasonic ranging in the near zone, according to an embodiment. Ultrasonic ranging device 100 may calculate the distance to a target object based on a first time period defined by a generated ultrasonic signal and a first echo signal when the target object (e.g., the top surface of material in a tank) is far from the transducer and may calculate the distance to the target object based on a second time period defined by a first echo signal and a second echo signal (or by subsequent sets of echo signals) when the target is close to ranging device 100.

Ultrasonic ranging device 100 may include power supply 105, processor 110, oscillator 115, output circuit 120, detector 125, input amplifier 130, transducer 135, output amplifiers 140, transformer 145 and capacitor 150. Power supply 105 may include one or more power supply units, which may be powered via any suitable input supply (not shown in FIG. 1A). For example, the input supply may be an AC line voltage (e.g., 120 VAC) or a DC line voltage (e.g., 24 VDC). Power supply 105 may have one or more outputs. For example, as shown in FIG. 1A, the output voltages of power supply 105 may be fed to multiple components within ultrasonic ranging device 100, such as processor 110, oscillator 115, detector 125, input amplifier 130, etc. Each output of power supply 105 may consist of a different output voltage (e.g., +3V for processor related circuits and +10 V for amplifier and detector related circuits).

Processor 110 may be connected to oscillator 115, which may be any suitable circuit or device for generating recurring waveforms (i.e., electrical signals). Processor 110 may be any suitable processor containing executable instructions for causing oscillator 115 to generate an electrical signal and for calculating the distance between ranging device 100 and a target object based on the time periods between ultrasonic signals and/or electrical signals. For example, processor 110 may initiate a ping voltage, which may cause oscillator 115 to generate an electrical signal. The electrical signal may be of any suitable amplitude and/or frequency. The electrical signal generated by oscillator 115 may be amplified via output amplifiers 140. The output of output amplifiers 140 may then be fed to the primary side of transformer 145, which may be any suitable transformer for stepping-up the amplitude of an input electrical signal. The stepped-up electrical signal at the secondary side of transformer 145 may be applied across both capacitor 150 and transducer 135, which may be any suitable circuit or device for generating ultrasonic signals from electrical signals and vice versa.

Transducer 135 may receive the stepped-up electrical signal at the secondary side of transformer 145 and generate an ultrasonic signal with a predetermined amplitude. The frequency of the generated ultrasonic signal may be beyond the range of human hearing (e.g., at least 20 kHz). The generated ultrasonic signal may be transmitted, or directed, towards to a target object. Transducer 135 may continue to "ring" (i.e., generate an ultrasonic signal) for a certain period of time even after power is removed from transformer 145. Thus, transducer 135 may not be able to detect reflected ultrasonic signals, or echo signals, during the ringing time as a result of signal interference with the generated ultrasonic signal.

Upon reaching the target object, some or all of the generated ultrasonic signal may be reflected, creating a first reflected ultrasonic signal, or first echo signal, that may travel back towards ranging device 100. Some or all of the first echo signal may then reflect from ranging device 100 and travel back towards the target object. Upon reaching the target object, some or all of the first echo signal may reflect from the target object, creating a second echo signal that may travel back towards ranging device 100. Some or all of the second echo signal may then reflect from ranging device 100 and travel back towards the target object. Upon reaching the target object, some or all of the second echo signal may reflect from the target object, creating a third echo signal that may travel back towards ranging device 100. The amplitude of each subsequent echo signal may decrease, or decay. Thus, this process may continue until the amplitude of subsequent echo signals eventually reaches a level that is not detectable by ranging device 100. Each reflected ultrasonic signal, or echo signal, may be detected by transducer 135, which may generate a corresponding electrical signal. Thus, transducer 135 may generate a first electrical signal based on the first echo signal, a second electrical signal based on the second echo signal, a third electrical signal based on the third echo signal, and so forth.

Processor 110 may also be connected to detector 125, which may be connected to transducer 135 via input amplifier 130. Detector 125 may include any suitable circuit or device for filtering and/or level shifting electrical signals received from input amplifier 130. As shown in FIG. 1A, electrical signals from transducer 135 may be fed to input amplifier 130, which may include one or more amplifiers for amplifying the electrical signals. Detector 125 may then receive the amplified electrical signals and perform any necessary filtering and/or level shifting. The output of detector 125 may then be fed to processor 110, which may determine the distance to a target object based on the time period defined by one or more sets of electrical signals received from detector 125. Accordingly, each set of electrical signals received from detector 125 may correspond to a respective set of ultrasonic signals detected at transducer 135.

For example, a time period defined by a given set of electrical signals may correspond to the time it takes for the generated ultrasonic signal to travel to a target object and reflect back to ranging device 100. The speed of the ultrasonic signal to and from the target object may remain constant. Thus, the distance to the target object may be calculated by dividing the time period approximately in half and multiplying the result by the speed of the ultrasonic signal, which may be approximately equal to the speed of sound. It will be appreciated that the value for the speed of sound in the distance calculation may be adjusted to compensate for certain environmental factors, such as temperature, transmission medium, humidity, and the like.

In order to measure the distance to a target object that is located either inside or outside the near zone, processor 110 may measure a first time period defined by the generated ultrasonic signal and the first echo signal, which may correspond to a first detected echo signal. Processor 110 may then determine whether the first time period is greater than or equal to a second predetermined time period, which may represent a threshold at which the target object is deemed to be sufficiently beyond the near zone of ranging device 100. If the first time period is greater than or equal to the second predetermined time period, processor 110 may calculate the distance to the target object based on the first time period. If the first time period is less than the second predetermined time period, processor may wait for at least one additional echo signal, which may correspond to a second detected echo signal. Processor 110 may then measure a third time period defined by consecutive echo signals. It will be appreciated that the third time period may be defined by any two consecutive echo signals that are detected after the generated ultrasonic signal (e.g., first and second detected echo signals, second and third detected echo signals, third and fourth detected echo signals, and so forth).

Processor 110 may then compare the first and third time periods. If the first time period is substantially equal to the third time period, the target object may be outside of the near zone and processor 110 may calculate the distance to the target object based on either the first time period or the third time period. If the first time period is at least two times greater than the third time period, the target object may be located within the near zone and processor 110 may calculate the distance to the target object based on the third time period.

The distance calculated by processor 110 may then be fed to output circuit 120, which may be any suitable circuit or device for conveying and/or processing the distance information. For example, output circuit 120 may be an analog indicator, a digital indicator, and/or a series of relays configured to actuate upon a predetermined measured distance (e.g., configured to shut-off a pump when material in a tank reaches a predetermined level). In addition, output circuit 120 may be any suitable circuit or device for transmitting the distance information to a remote control system. For example, output circuit 120 may transmit the distance information via a 4-20 mA loop or via a digital interface (e.g., Hart protocol, Ethernet).

In an alternative embodiment, ultrasonic ranging device 100 may generate an ultrasonic signal with a lower amplitude when a target object is near ranging device 100 (e.g., within the near zone) and may generate an ultrasonic signal with a higher amplitude when the target object is farther away from ranging device 100 (e.g., outside of the near zone). In this manner, echo signals from the target object may be more usable (i.e., more easily detectable). For example, as the distance between the target object and ranging device 100 is reduced, the amplitude of the generated ultrasonic signal may be reduced because the ultrasonic signal may not have to travel a long distance. By reducing the amplitude of the generated ultrasonic signal, a lower ringing duration may be achieved, thereby reducing the size of the near zone. As the distance between the target object and ranging device 100 is increased, the amplitude of the generated ultrasonic signal may be increased in order to ensure that the ultrasonic signal reaches the target object. Any resulting increase in ringing time due to the increased amplitude of the generated ultrasonic signal may be inconsequential because the target object is located sufficiently beyond the near zone.

Figure 1B:
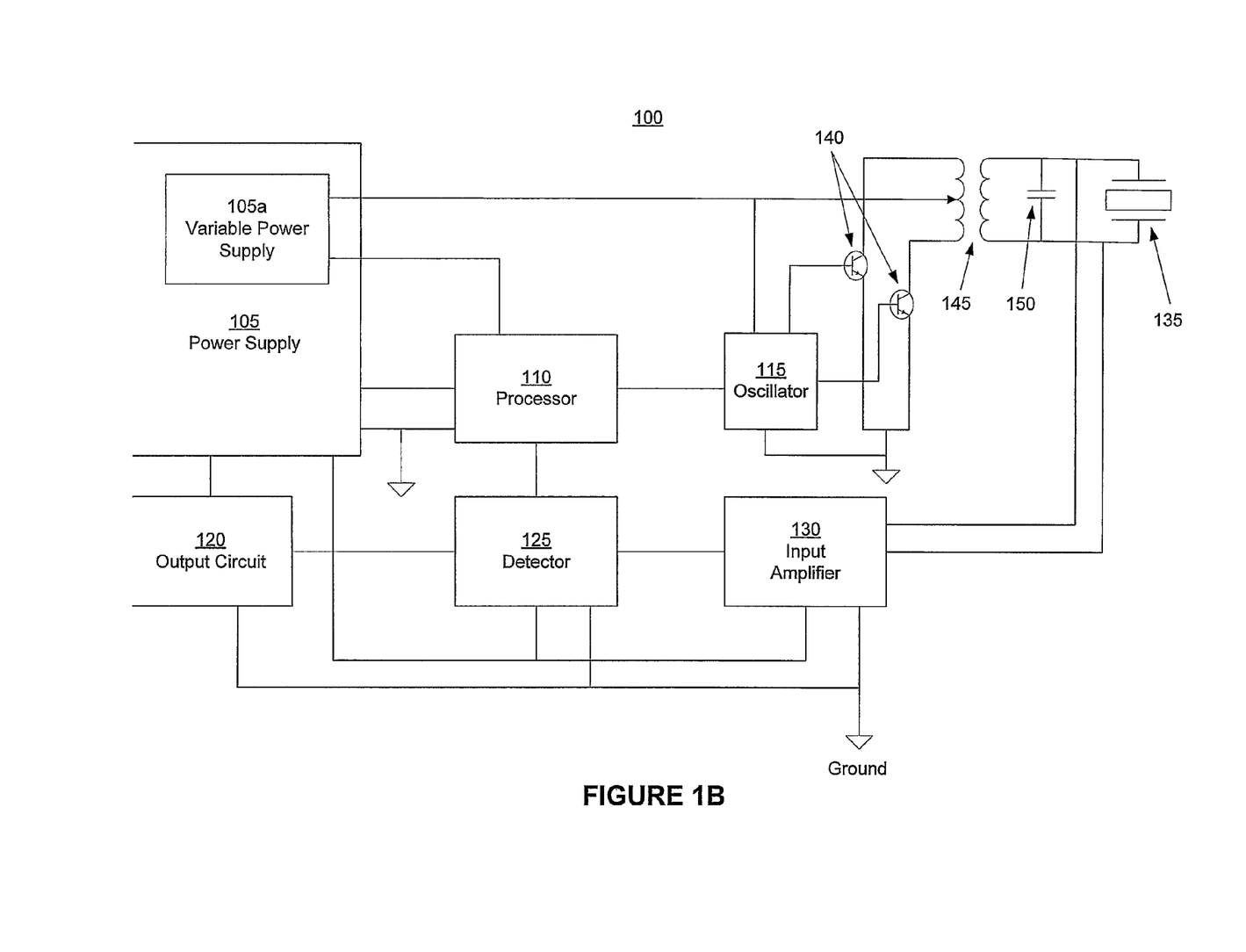
FIG. 1B is a block diagram of an ultrasonic ranging device, in accordance with an alternative embodiment.

FIG. 1B is a block diagram of an example ultrasonic ranging device for adjusting the amplitude level of a generated ultrasonic signal. As shown in FIG. 1B, ultrasonic ranging device 100 may also include variable power supply 105a, which may be part of or separate from power supply 105. The output voltage of variable power supply 105a may be supplied to the primary side of transformer 145 and may be adjusted by processor 110 via any suitable control circuit (not shown in FIG. 1B). The supply voltage to transformer 145 may control the step-up in amplitude between the primary and secondary sides of transformer 145. Thus, processor 110 may reduce the amplitude of the electrical signal at the secondary side of transformer 145 by decreasing the supply voltage and may increase the amplitude of the electrical signal at the secondary side of transformer 145 by increasing the supply voltage. By lowering the amplitude of the electrical signal at the secondary side of transformer 145, the amplitude of the ultrasonic signal generated by transducer 135 may also be reduced. Thus, the ringing time in transducer 135 may be decreased as the amplitude of the generated ultrasonic signal is decreased, thereby enabling transducer 135 to detect echo signals from target objects that are close to ranging device 100.

Processor 110 may incrementally increase the output voltage of variable power supply 105a by a predetermined amount between a first and second output voltage. The first voltage may represent a minimum output voltage and the second output voltage may represent a maximum output voltage. Thus, in order to determine the distance to a target object that is located close to ranging device 100, processor 110 may adjust the output voltage of variable power supply 105a lower to a first output voltage and then ping oscillator 115 to generate an electrical signal. After the ultrasonic signal is generated by transducer 135, processor 110 may listen for a reflected ultrasonic signal, or echo signal, for a predetermined period of time. If an echo signal is not received, processor 110 may incrementally increase the output voltage and may again ping oscillator 115. This process may be repeated until an echo signal is detected or until the second output voltage level is reached.

Figure 2A:
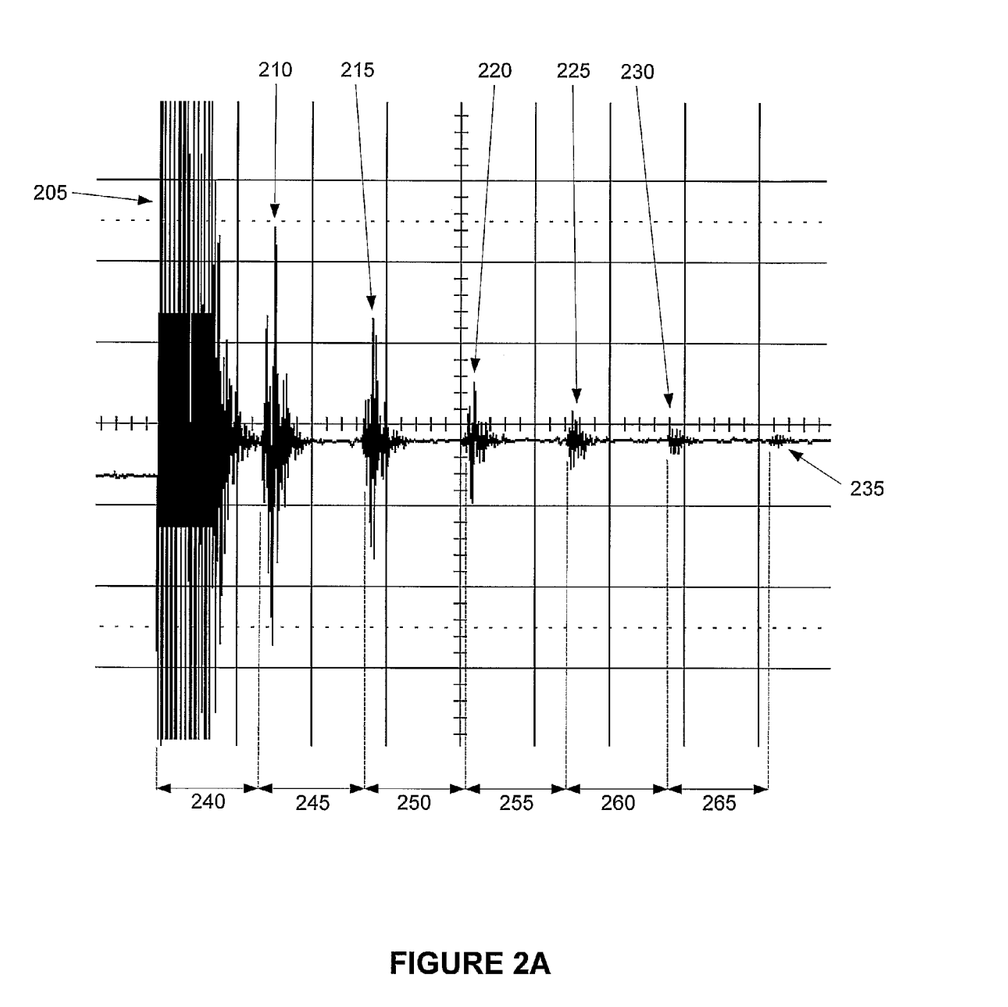
FIG. 2A is an example signal plot of amplitude versus time illustrating a generated ultrasonic signal and corresponding return echo signals from a target object located outside of a near zone.

FIG. 2A is an example signal plot of amplitude versus time illustrating a generated ultrasonic signal and corresponding return echo signals from a target object located outside of the near zone of ultrasonic ranging device 100. As shown in FIG. 2A, generated ultrasonic signal 205 may reflect from the target object, creating a series of echo signals (e.g., echo signals 210, 215, 220, 225, 230 and 235) that may be detected at transducer 135 in ranging device 100. Generated ultrasonic signal 205 and echo signal 210 may define time period 240, echo signals 210 and 215 may define time period 245, echo signals 215 and 220 may define time period 250, echo signals 220 and 225 may define time period 255, echo signals 225 and 230 may define time period 260, and echo signals 230 and 235 may define time period 265. Each of the respective time periods 240 to 265 may correspond to the time it takes for an ultrasonic signal to travel to and from the target object. The ultrasonic signal may travel each direction at the same speed (e.g., at the speed of sound). As shown in FIG. 2A, each of the respective time periods 240 to 265 may be the same when the target object is located outside the near zone of ranging device 100. Thus, processor 110 may calculate the distance to the target object based on any of time periods 240 to 265.

Figure 2B:
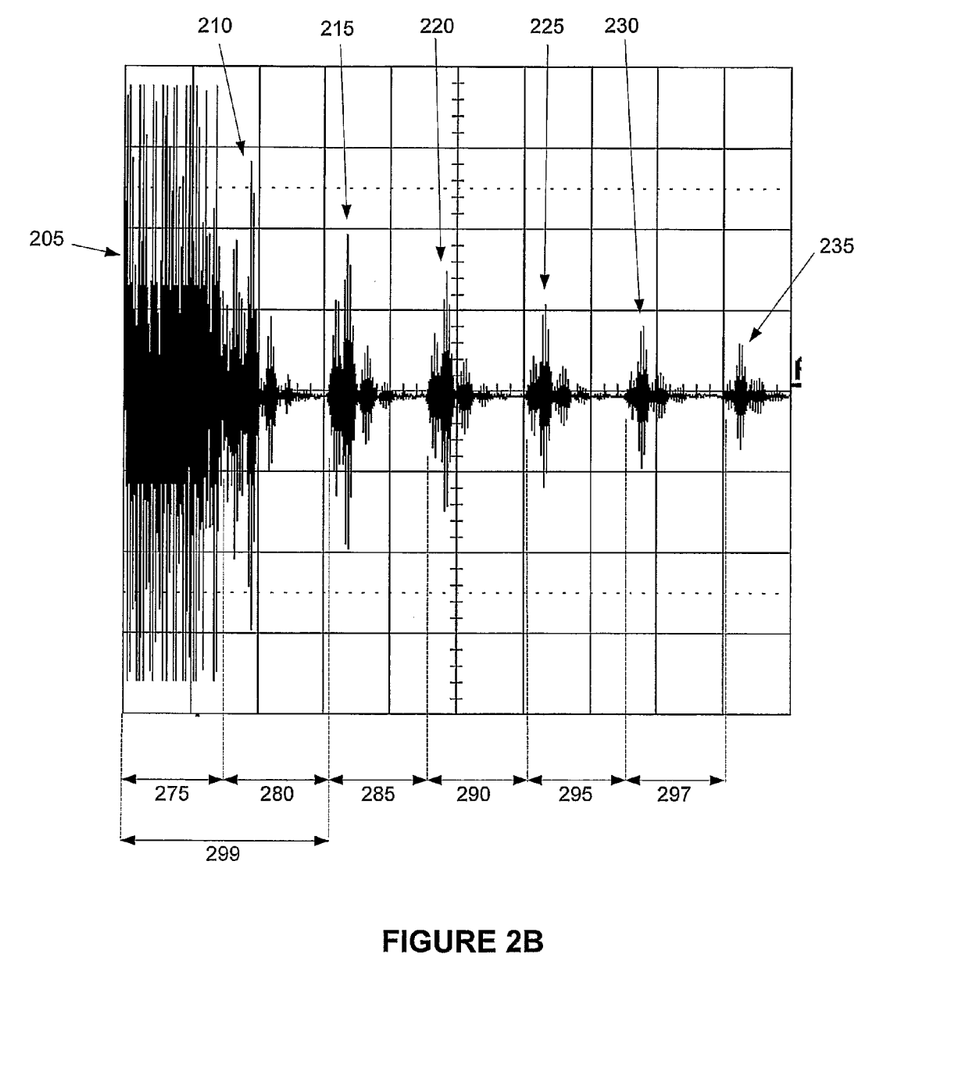
FIG. 2B is an example signal plot of amplitude versus time illustrating a generated ultrasonic signal and corresponding return echo signals from a target object located within a near zone.

FIG. 2B is an example signal plot of amplitude versus time illustrating a generated ultrasonic signal and corresponding return echo signals from a target object located within the near zone of ultrasonic ranging device 100. Similar to FIG. 2A, generated ultrasonic signal 205 may reflect from the target object, creating a series of echo signals (e.g., echo signals 210, 215, 220, 225, 230 and 235). Generated ultrasonic signal 205 and echo signal 210 may define time period 275, echo signals 210 and 215 may define time period 280, echo signals 215 and 220 may define time period 285, echo signals 220 and 225 may define time period 290, echo signals 225 and 230 may define time period 295, and echo signals 230 and 235 may define time period 297. As shown in FIG. 2B, echo signal 210 may not be detected because it overlaps with the ultrasonic signal generated as a result of the ringing effect in transducer 135. Thus, processor 110 may not be capable of determining time period 275 and, therefore, echo signal 215 may correspond to the first detected echo signal.

As shown in FIG. 2B, time period 299 may correspond to the time period defined by generated ultrasonic signal 205 and echo signal 215. Time period 299 may equal the sum of time periods 275 and 280. As noted above, the time periods defined by consecutive ultrasonic signals (e.g., time periods 275 to 297) may be substantially equal because the ultrasonic signals may travel to and from the target object at the same speed. Thus, time period 299 may be approximately two times greater than time periods 275 to 297 and, therefore, may not represent an accurate distance to the target object. Consequently, as noted above, processor 110 may compare time period 299 to at least one of time periods 280 to 297. If time period 299 is two times greater, processor 110 may calculate the distance to the target object based on any of time periods 280 to 297. It will be appreciated that as the target object is moved closer to ranging device 100, additional echo signals (e.g., echo signals 215, 220, 225, etc.) may overlap with generated ultrasonic signal 205. Thus, the time period defined by generated ultrasonic signal 205 and the first detected echo signal may increase.

It will also be appreciated that time periods 240 to 265 and 275 to 297 may be determined in any manner that is consistent with the travel time of an ultrasonic signal between ranging device 100 and a target object. For example, as shown in FIG. 2A, time periods 240 to 265 may be determined by measuring the time between the leading edge of each consecutive ultrasonic signal. Time periods 240 to 265 may also be determined by measuring the time between peak amplitudes of each consecutive ultrasonic signal.

Figure 3A:
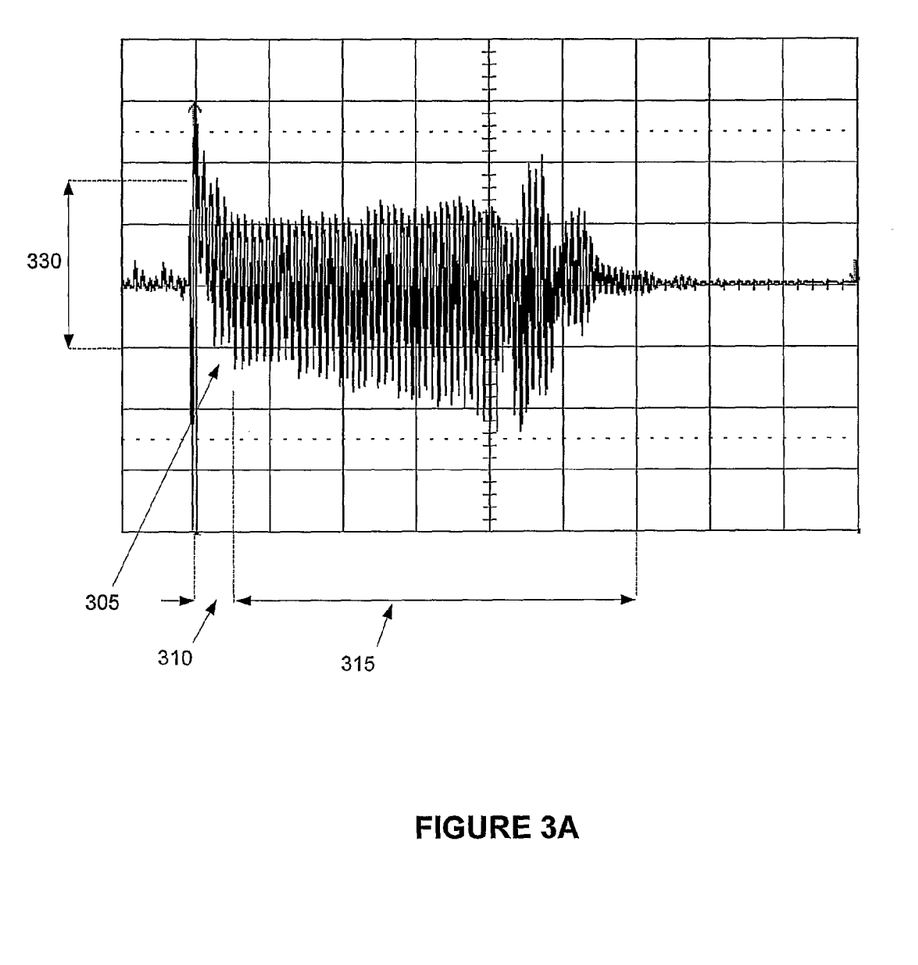
FIGS. 3A and 3B are example signal plots of amplitude versus time illustrating the relationship between the amplitude of a generated ultrasonic signal and ringing duration.
Figure 3B:
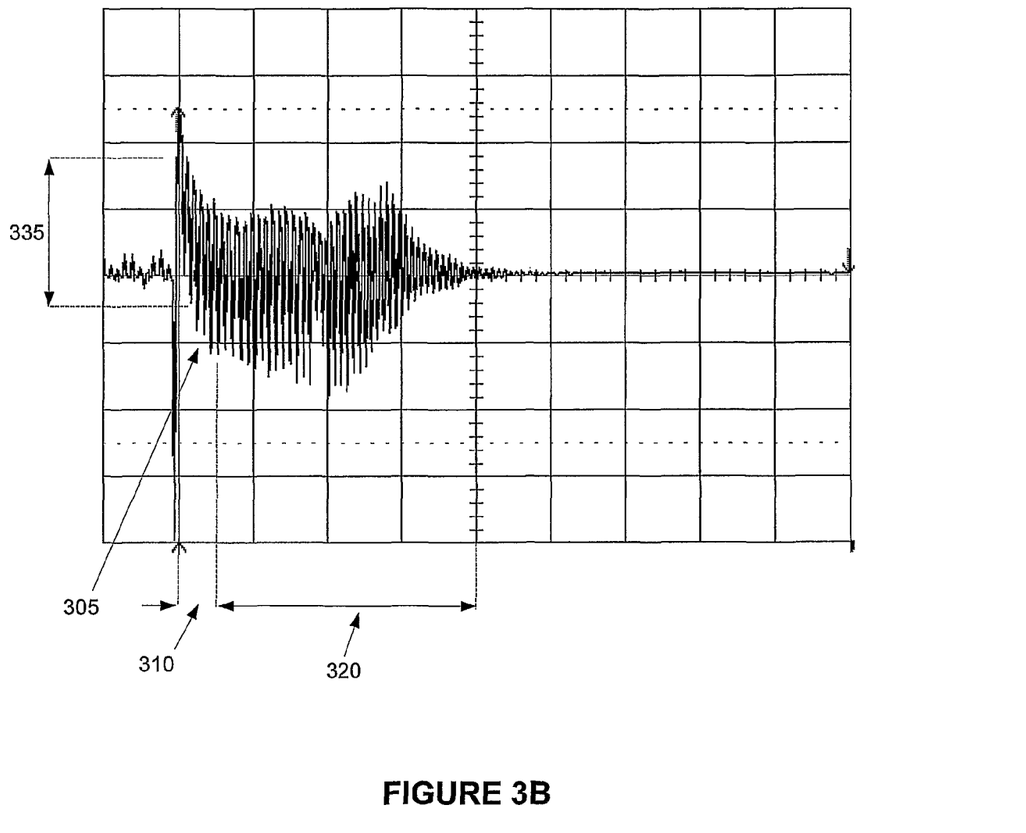

FIGS. 3A and 3B are example signal plots of amplitude versus time illustrating the relationship between the amplitude of a generated ultrasonic signal and ringing duration of transducer 135 in ranging device 100. In FIG. 3A, ultrasonic signal 305 with amplitude 330 may be generated by transducer 135 by applying supply voltage V1 (not shown in FIG. 3A) from variable power supply 105a to the primary side of transformer 145. Supply voltage V1 may be applied to transformer 145 for time period 310. As shown in FIG. 3A, transducer 135 may continue to ring for time period 315. The sum of time periods 310 and 315 may correspond to a first near zone.

In FIG. 3B, ultrasonic signal 305 with amplitude 335 may be generated by transducer 135 by applying supply voltage $V_2$ (not shown in FIG. 3B) from variable power supply 105a to the primary side of transformer 145. Supply voltage $V_2$ may be smaller than V and may also be applied to transformer 145 for time period 310. As shown in FIG. 3B, transducer 135 may continue to ring for time period 320. The sum of time periods 310 and 320 may correspond to a second near zone. As shown in FIGS. 3A and 3B, amplitude 335 may be smaller than amplitude 330. In addition, time period 320 may be smaller than time period 315, thereby reducing the size of the second near zone with respect to the first near zone. Thus, ranging device 100 may be capable of detecting a closer target object by reducing the amplitude, or energy, of generated ultrasonic signal 305.

Figure 4:
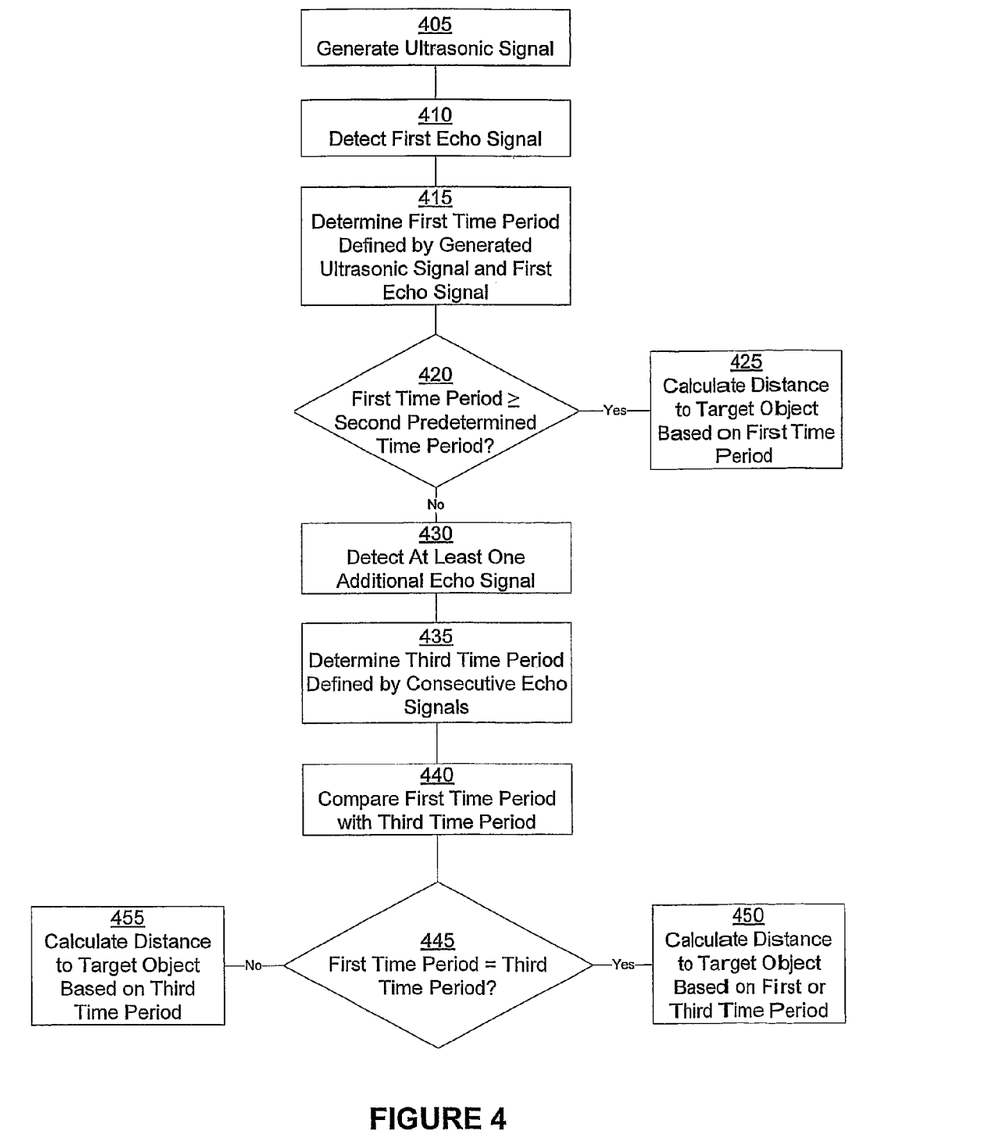
FIG. 4 is a flow diagram illustrating an example method of ultrasonic ranging in the near zone.

FIG. 4 is a flow diagram illustrating an example method of ultrasonic ranging in the near zone. As shown in FIG. 4, at 405, an ultrasonic signal may be generated by ultrasonic ranging device 100 and directed towards a target object. At 410, a first echo signal may be detected. At 415, a first time period defined by the generated ultrasonic signal and the first echo signal may be determined. At 420, it may be determined whether the first time period is greater than or equal to a second predetermined time period, which may represent a threshold at which the target object is deemed to be sufficiently beyond the near zone of ranging device 100. If the first time period is greater than or equal to the second predetermined time period, the process proceeds to 425. At 425, the distance to the target object is calculated based on the first time period. If the first time period is less than the second predetermined time period, the process proceeds to 430.

At 430, at least one additional echo signal may be detected by ultrasonic ranging device 100. At 435, a third time period defined by any two consecutively detected echo signals may be determined. At 440, the first time period may be compared with the third time period. At 445, it may be determined whether the first time period is substantially equal to the third time period. If the first time period is substantially equal to the third time period, the process proceeds to 450. At 450, the distance to the target object may be calculated based on either the first or third time periods. If the first time period is at least two times greater than the third time period, the process proceeds to 455. At 455, the distance to the target object may be calculated based on the third time period. As noted above, it will be appreciated that the third time period may be defined by any two consecutive echo signals that are detected after the generated ultrasonic signal.

Figure 5:
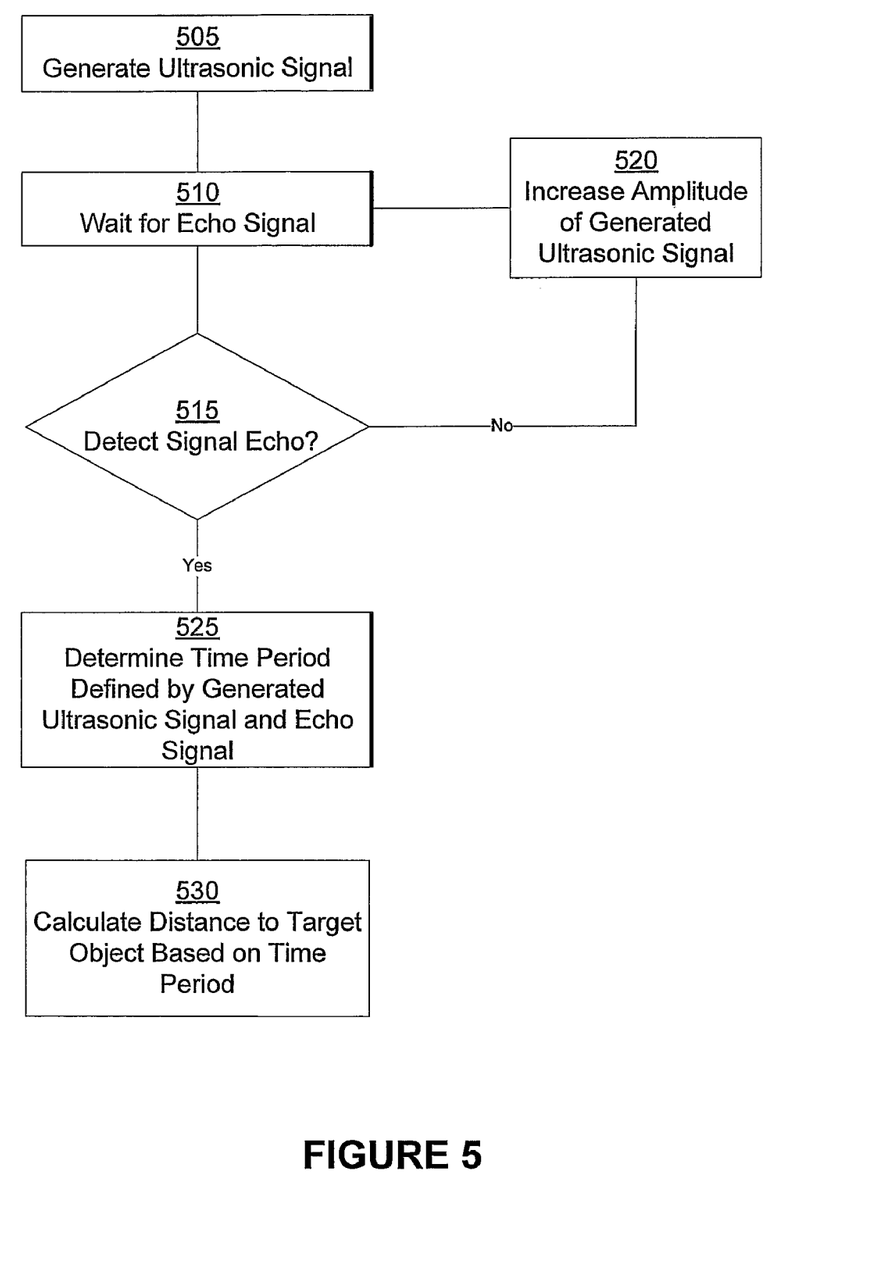
FIG. 5 is a flow diagram illustrating an alternative example method of ultrasonic ranging in the near zone.

FIG. 5 is a flow diagram illustrating an alternative example method of ultrasonic ranging in the near zone. As shown in FIG. 5, at 505, an ultrasonic signal may be generated by ultrasonic ranging device 100. At 510, ranging device 100 may wait for an echo signal for a predetermined period of time. At 515, it may be determined whether an echo signal is detected. If an echo signal is not detected, the process proceeds to 520. At 520, the amplitude of the generated ultrasonic signal may be increased. For example, as noted above, the amplitude of the generated ultrasonic signal may be increased by increasing the amplitude of the input electrical signal at transducer 135. The process may proceed back to 510, where ranging device 100 may again wait for an echo signal for a predetermined period of time. If an echo signal is detected, the process may proceed to 525. At 525, a time period defined by the generated ultrasonic signal and the echo signal. At 530, the distance to the target object is calculated based on the time period.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An ultrasonic ranging device for determining a distance to a target object, comprising:
   a transducer for generating an ultrasonic signal and detecting an echo signal; and
   a processor for calculating the distance to the target object based on a first time period defined by a first set of ultrasonic signals when the target object is located outside a near zone and a second time period defined by a second set of ultrasonic signals when the target object is located within the near zone, wherein the first set of ultrasonic signals comprises the generated ultrasonic signal and a first echo signal, and wherein the second set of ultrasonic signals comprises a second echo signal and a third echo signal.

2. The ultrasonic ranging device of claim 1, wherein the first echo signal is detected by the transducer sequentially after the generated ultrasonic signal and wherein the second echo signal and the third echo signal are detected sequentially, respectively, after the first echo signal.

3. A method for determining a distance to a target object using an ultrasonic ranging device, comprising:
   generating an ultrasonic signal;
   detecting a first echo signal;
   determining a first time period defined by the generated ultrasonic signal and the first echo signal;
   comparing the first time period to a second predetermined time period;
   detecting a second echo signal;
   determining a third time period;
   comparing the first time period with the third time period; and
   calculating the distance to the target object.

4. The method of claim 3, wherein the third time period is defined by the first echo signal and the second echo signal.

5. The method of claim 3, further comprising detecting a third echo signal, wherein the third time period is defined by the second echo signal and the third echo signal.

6. The method of claim 3, wherein the distance to the target object is calculated based on the first time period when the first time period is at least equal to the second predetermined time period.

7. The method of claim 3, wherein the distance to the target object is calculated based on the either first time period or the third time period when the first time period and the third time period are substantially equal.

8. The method of claim 3, wherein the distance to the target object is calculated based on the third time period when the first time period is at least two times greater than the third time period.

9. A method for determining a distance to a target object using a ranging device, comprising:
   generating a signal;
   detecting an echo of said signal;
   determining a first time period defined by the generated signal and the echo signal;
   comparing the first time period to a second time period, said second time period being predetermined;
   detecting a subsequent echo of said signal;
   determining a third time period;
   comparing the first time period with the third time period; and
   calculating the distance to the target object.

* * * * *